United States Patent
Huang et al.

(10) Patent No.: US 11,051,528 B2
(45) Date of Patent: Jul. 6, 2021

(54) METHOD FOR PROCESSING GREEN COFFEE BEAN

(71) Applicant: Yu-Ting Huang, Kaohsiung (TW)

(72) Inventors: Yu-Ting Huang, Kaohsiung (TW); Cheng-Yi Chien, Kaohsiung (TW)

(73) Assignee: Yu-Ting Huang, Kaohsiung (TW)

( * ) Notice: Subject to any disclaimer, the term of this patent is extended or adjusted under 35 U.S.C. 154(b) by 183 days.

(21) Appl. No.: 16/538,888

(22) Filed: Aug. 13, 2019

(65) Prior Publication Data
US 2020/0093153 A1 Mar. 26, 2020

(30) Foreign Application Priority Data

Sep. 21, 2018 (TW) .................... 107133436
Apr. 8, 2019 (TW) .................... 108112139

(51) Int. Cl.
*A23F 5/02* (2006.01)

(52) U.S. Cl.
CPC ............ *A23F 5/02* (2013.01); *A23F 2200/00* (2013.01)

(58) Field of Classification Search
CPC ............................. A23F 5/02; A23F 2200/00
See application file for complete search history.

(56) References Cited

U.S. PATENT DOCUMENTS

| 2,278,473 | A | * | 4/1942 | Musher | A23F 5/14 426/93 |
| 4,260,639 | A | * | 4/1981 | Zosel | B01D 11/0203 426/478 |
| 4,728,525 | A | * | 3/1988 | Toro | B01D 11/0203 426/427 |
| 4,911,941 | A | * | 3/1990 | Katz | A23F 5/206 426/427 |
| 4,938,978 | A | * | 7/1990 | Husaini | A23F 5/04 426/461 |
| 4,996,317 | A | * | 2/1991 | O'Brien | C07D 473/12 544/274 |
| 2017/0332655 | A1 | * | 11/2017 | Okamura | A23F 5/206 |

FOREIGN PATENT DOCUMENTS

| CN | 106998727 A | | 8/2017 |
| DE | 3445502 | * | 6/1985 |

OTHER PUBLICATIONS

English Translation for DE3445502 published Jun. 1985.*

* cited by examiner

*Primary Examiner* — Anthony J Weier
(74) *Attorney, Agent, or Firm* — WPAT, PC

(57) ABSTRACT

In the penetration step, a carbon dioxide fluid is contacted to a sample of coffee green bean inside a chamber at a temperature of 28-50° C. and a pressure of 950-3,500 psi for 3-30 minutes to allow the carbon dioxide fluid to penetrate into the sample of coffee green bean. In a pressure relief step, the pressure in the chamber is reduced to normal pressure in a time period of 2-15 minutes, allowing the carbon dioxide fluid penetrated into the sample of coffee green bean to break down cell wall of the sample of coffee green bean to obtain a sample of coffee green bean with broken cell wall.

6 Claims, 1 Drawing Sheet

METHOD FOR PROCESSING GREEN COFFEE BEAN

CROSS REFERENCE TO RELATED APPLICATIONS

The application claims the benefit of Taiwan application serial No. 107133436, filed Sep. 21, 2018, as well as of No. 108112139, filed Apr. 8, 2019, the entire contents of which are incorporated herein by reference.

BACKGROUND OF THE INVENTION

1. Field of the Invention

The present invention generally relates to a method for processing coffee bean, and more particularly, to a method for processing green coffee bean.

2. Description of the Related Art

In general, after washing or drying, a coffee bean (a coffee green bean) is roasted, that is, to be heated to undergo a series of physical and chemical reaction, to turn a brown color. The coffee bean being roasted can form a coffee drink with special smell.

The sample of coffee green bean is rich in chlorogenic acid. Chlorogenic acid shows great antioxidant activity, and can be used to scavenge free radicals, lower blood pressure, lower blood sugar, burn fat and even have anti-tumor effect. However, $CO_2$ gas and water vapor produced inside the sample of coffee green bean during the roasting process smolders inside the sample of coffee green bean, and thus break down chlorogenic acid. Therefore, the conventional roasted coffee bean has rare chlorogenic acid, and consumers cannot consume chlorogenic acid by drinking the coffee drinks obtained by brewing the conventional roasted coffee bean. In light of this, if a method for processing green coffee bean in which the sample of coffee green bean is pre-processed to retain a large amount of chlorogenic acid even after the roasting process can be provided, consumers can consume the large amount of chlorogenic acid while drinking coffee drinks, which can significantly improve the health of consumers.

SUMMARY OF THE INVENTION

It is therefore the objective of this invention to provide a method for processing green coffee bean, obtaining a processed green coffee bean retaining a large amount of chlorogenic acid even after the roasting process.

One embodiment of the invention discloses a method for processing green coffee bean, including a penetration step and a pressure relief step. In the penetration step, a carbon dioxide ($CO_2$) fluid is contacted to a sample of coffee green bean inside a chamber at a temperature of 28-50° C. and a pressure of 950-3,500 psi for 3-30 minutes to allow the $CO_2$ fluid to penetrate into the sample of coffee green bean. In a pressure relief step, the pressure in the chamber is reduced to normal pressure in a time period of 2-15 minutes, allowing the $CO_2$ fluid penetrated into the sample of coffee green bean to break down cell wall of the sample of coffee green bean to obtain a sample of coffee green bean with broken cell wall.

Accordingly, in the method for processing green coffee bean according to the present invention, the supercritical $CO_2$ fluid (or the subcritical $CO_2$ fluid) can penetrate into the sample of coffee green bean, and act to breakdown the cell wall of the sample of coffee green bean in the short time period. Thus, in the followed roasting step, the $CO_2$ gas and the water vapor produced inside the sample of coffee green bean can escape rapidly, and the sample of roasted coffee bean with a large amount of chlorogenic acid can be obtained.

In a preferred form shown, in the penetration step, the $CO_2$ fluid is contacted to the sample of coffee green bean inside the chamber at the temperature of 30-45° C. and the pressure of 1,050-1,500 psi for 3-10 minutes. As such, the supercritical $CO_2$ fluid (or the subcritical $CO_2$ fluid) can effectively penetrate into the sample of coffee green bean.

In a preferred form shown, in the pressure relief step, the pressure in the chamber is reduced to normal pressure in the time period of 2-6 minutes. As such, the supercritical $CO_2$ fluid (or the subcritical $CO_2$ fluid) penetrated into the sample of coffee green bean can effectively break down the cell wall of the sample of coffee green bean.

In a preferred form shown, the method for processing green coffee bean further includes a pressurizing step. In the pressurizing step, the chamber is pressurized until the chamber has the pressure of 950-3,500 psi after introducing the carbon dioxide fluid into the chamber with the sample of coffee green bean inside. As such, sample of green coffee bean and the supercritical $CO_2$ fluid (or the subcritical $CO_2$ fluid) can contact uniformly.

In a preferred form shown, a sum of the time period of the pressurizing step, the time period of the penetration step and the time period of the pressure relief step is 10-45 minutes. As such, flavor loss of the sample of coffee green bean can be prevented.

In a preferred form shown, the method for processing green coffee bean further includes a roasting step. In the roasting step, the sample of coffee green bean with broken cell wall is roasted at 180-240° C. for 7-15 minutes. As such, a coffee drink with special flavor can be obtained.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE INVENTION

Figure 1:
FIG. 1 depicts an image representing the cell wall of the conventional sample of roasted coffee bean of group A1.

An embodiment of a method for processing green coffee bean according to the present invention can include a penetration step and a pressure relief step.

Specifically, in the penetration step, a carbon dioxide ($CO_2$) fluid is penetrated into a sample of coffee green bean. As an example, the sample of coffee green bean can be placed in a chamber with a temperature of 28-50° C., as well as a pressure of 950-3,500 psi. At this time, the carbon dioxide fluid in a supercritical form or a subcritical form (that is, a supercritical $CO_2$ fluid or a subcritical $CO_2$ fluid) can contact the sample of coffee green bean inside the chamber for 3-30 minutes, and can penetrate into the sample of coffee green bean by the property of high penetrability.

Preferably, the $CO_2$ fluid can contact the sample of coffee green bean at the temperature of 30-45° C., the pressure of 1,050-1,500 psi for 3-10 minutes.

Moreover, a pressurizing step can be carried out before the penetration step. In the pressurizing step, the $CO_2$ fluid such as a $CO_2$ gas or a $CO_2$ liquid can be provided by a CO2 source. After the $CO_2$ gas (or the $CO_2$ liquid) is introduced into the chamber with the sample of coffee green bean inside (the chamber has the temperature of 28-50° C.), the pressure inside the chamber is increased to allow a phase transition of $CO_2$ (the transition from the $CO_2$ gas or the $CO_2$ liquid to the supercritical $CO_2$ fluid or the subcritical $CO_2$ fluid), and the penetration step can be continuously carried out.

Then, in the pressure relief step, the pressure inside the chamber is reduced to the normal pressure (about 14.7 psi) in a short time period. At this time, due to the rapid change of the pressure, the supercritical $CO_2$ fluid (or the subcritical $CO_2$ fluid) penetrated into the sample of coffee green bean can break down the cell wall of the sample of coffee green bean to obtain a sample of coffee green bean with broken cell wall. Preferably, in the pressure relief step, the pressure inside the chamber is reduced to the normal pressure in the time period of 2-15 minutes.

It is worthy to be noted that polyphenols such as chlorogenic acid can be dissolved in the supercritical $CO_2$ fluid. Thus, in order to shorten the time period that the sample of coffee green bean contacts to the supercritical $CO_2$ fluid, to prevent the polyphenols in the sample of coffee green bean from dissolving in the supercritical $CO_2$, and to prevent the dissolved polyphenols from bringing out by the supercritical $CO_2$ fluid, in this embodiment, sum of the time period of the pressurizing step, the time period of the penetration step and the time period of the pressure relief step is 10-45 minutes. With such performance, flavor loss of the sample of coffee green bean can be prevented.

After the penetration step and the pressure relief step, a roasting step can also be carried out. In the roasting step, the sample of coffee green bean with broken cell wall can be roasted at 180-240° C. for 7-15 minutes to obtain a sample of roasted coffee bean. At this time, due to the breakdown of the cell wall of the sample of coffee green bean by the supercritical $CO_2$ fluid (or the subcritical $CO_2$ fluid), in the roasting step, the $CO_2$ gas and a water vapor produced inside the sample of coffee green bean can escape rapidly, preventing from smoldering inside the sample of coffee green bean. Thus, the breakdown of chlorogenic acid due to the smoldering of the $CO_2$ gas and the water vapor can be prevented, and the sample of roasted coffee bean retaining the large amount of chlorogenic acid can be obtained.

Referring to TABLE 1, 10 grams of the conventional sample of roasted coffee bean (group A1) contains about 50-110 milligrams of chlorogenic acid, while 10 grams of the sample of roasted coffee bean according to the present invention (group A2) contains about 150-290 milligrams of chlorogenic acid. That is, after the roasting step, the sample of coffee green bean with broken cell wall retains the large amount of chlorogenic acid.

TABLE 1

| Groups | Penetration Step | Pressure Relief Step | Roasting Step |
|---|---|---|---|
| A1 | X | X | ○ |
| A2 | ○ | ○ | ○ |

Figure 2:
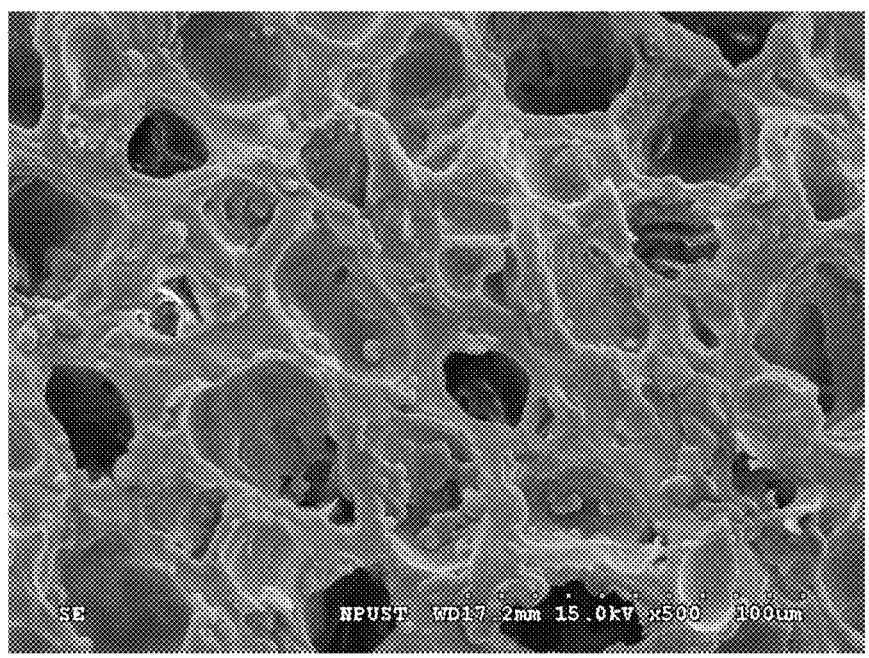
FIG. 2 depicts an image representing the cell wall of the sample of roasted coffee bean according to the present invention.

In addition, electron microscopy is used to demonstrate the cell wall of the conventional sample of roasted coffee bean (group A1), as well as the cell wall of the sample of roasted coffee bean according to the present invention (group A2). Referring to FIGS. 1-2, breakdown and deformation of the cell wall can be significantly observed in the sample of roasted coffee bean according to the present invention, suggesting that in the roasting step, the $CO_2$ gas and the water vapor produced inside the sample of coffee green bean can escape rapidly.

Accordingly, in the method for processing green coffee bean according to the present invention, the supercritical $CO_2$ fluid (or the subcritical $CO_2$ fluid) can penetrate into the sample of coffee green bean, and act to breakdown the cell wall of the sample of coffee green bean in the short time period. Thus, in the followed roasting step, the $CO_2$ gas and the water vapor produced inside the sample of coffee green bean can escape rapidly, and the sample of roasted coffee bean retaining the large amount of chlorogenic acid can be obtained.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A method for processing green coffee bean, comprising:
    a penetration step, by contacting a carbon dioxide fluid to a sample of coffee green bean inside a chamber at a temperature of 28-50° C. and a pressure of 950-3,500 psi for 3-30 minutes to allow the carbon dioxide fluid to penetrate into the sample of coffee green bean; and
    a pressure relief step, by reducing the pressure in the chamber to normal pressure in a time period of 2-15 minutes, allowing the carbon dioxide fluid penetrated into the sample of coffee green bean to break down cell wall of the sample of coffee green bean to obtain a sample of coffee green bean with broken cell wall.

2. The method for processing green coffee bean as claimed in claim 1, wherein in the penetration step, the carbon dioxide fluid is contacted to the sample of coffee green bean inside the chamber at the temperature of 30-45° C. and the pressure of 1,050-1,500 psi for 3-10 minutes.

3. The method for processing green coffee bean as claimed in claim 1, wherein in the pressure relief step, the pressure in the chamber is reduced to normal pressure in the time period of 2-6 minutes.

4. The method for processing green coffee bean as claimed in claim 1, further comprising a pressurizing step, by pressurizing the chamber until the chamber has the pressure of 950-3,500 psi after introducing the carbon dioxide fluid into the chamber with the sample of coffee green bean inside.

5. The method for processing green coffee bean as claimed in claim 4, wherein a sum of the time period of the pressurizing step, the time period of the penetration step and the time period of the pressure relief step is 10-45 minutes.

6. The method for processing green coffee bean as claimed in claim 1, further comprising a roasting step, by roasting the sample of coffee green bean with broken cell wall at 180-240° C. for 7-15 minutes.

* * * * *